United States Patent
Brzeski et al.

(10) Patent No.: US 6,902,137 B2
(45) Date of Patent: Jun. 7, 2005

(54) AIRCRAFT DOOR LATCH/LOCK MECHANISM WITH PNEUMATIC DECOMPRESSION OVERRIDE

(75) Inventors: Marek S. Brzeski, Long Beach, CA (US); Darrell James, Corona, CA (US); Hiep Vo, El Monte, CA (US)

(73) Assignee: Adams Rite Aerospace, Inc., Fullerton, CA (US)

( * ) Notice: Subject to any disclaimer, the term of this patent is extended or adjusted under 35 U.S.C. 154(b) by 315 days.

(21) Appl. No.: 10/241,283

(22) Filed: Sep. 9, 2002

(65) Prior Publication Data
US 2004/0046084 A1 Mar. 11, 2004

(51) Int. Cl.[7] .......................... B64C 1/14; E05B 15/02
(52) U.S. Cl. ............................. 244/129.5; 244/118.5; 244/129.4; 292/341.16; 292/23; 292/144; 292/138; 292/201
(58) Field of Search ................ 244/118.5, 129.4–129.5; 16/82–85; 292/341.16, 23, 144, 138, 201

(56) References Cited

U.S. PATENT DOCUMENTS

| | | | | | |
|---|---|---|---|---|---|
| 2,606,052 | A | * | 8/1952 | Soreng et al. ............... | 292/144 |
| 3,571,977 | A |   | 3/1971 | Abeel | |
| 3,638,984 | A | * | 2/1972 | Davidson ............... | 292/341.16 |
| 3,861,727 | A | * | 1/1975 | Froerup et al. ........ | 292/341.16 |
| 4,230,352 | A |   | 10/1980 | Sealey et al. | |
| 4,522,359 | A | * | 6/1985 | Church et al. ........... | 244/129.5 |
| 4,681,286 | A |   | 7/1987 | Church et al. | |
| 5,048,239 | A |   | 9/1991 | Filitz et al. | |
| 5,118,053 | A |   | 6/1992 | Singh et al. | |
| 5,765,883 | A | * | 6/1998 | Dessenberger et al. | |
| 5,782,511 | A |   | 7/1998 | Schwarz | |
| 5,934,720 | A |   | 8/1999 | Karalius | |
| 6,457,675 | B1 | * | 10/2002 | Plude et al. ............. | 244/129.5 |
| 2002/0092951 | A1 |   | 7/2002 | Haviv | |
| 2003/0066930 | A1 | * | 4/2003 | Pratt et al. ............... | 244/118.5 |
| 2004/0094670 | A1 | * | 5/2004 | Pratt et al. ............... | 244/129.4 |

FOREIGN PATENT DOCUMENTS

DE    41 03 014 C1    3/1992
FR    1 021 024 A    2/1953

OTHER PUBLICATIONS

European Search Report, dated Dec. 12, 2003, 4 pages.
2 pages of Adams Rite Sabre International Inc. Catalog, dated 1994.

* cited by examiner

Primary Examiner—Michael J. Carone
Assistant Examiner—Lulit Semunegus
(74) Attorney, Agent, or Firm—Knobbe, Martens, Olson & Bear, LLP

(57) ABSTRACT

A door latch mechanism mounted in a door frame cooperates with a door bolt separating the cockpit compartment on an aircraft from the passenger compartment. The mechanism prevents a hijacker from entering the cockpit compartment and allows the door to open rapidly when a catastrophic decompression event occurs in the airplane.

19 Claims, 8 Drawing Sheets

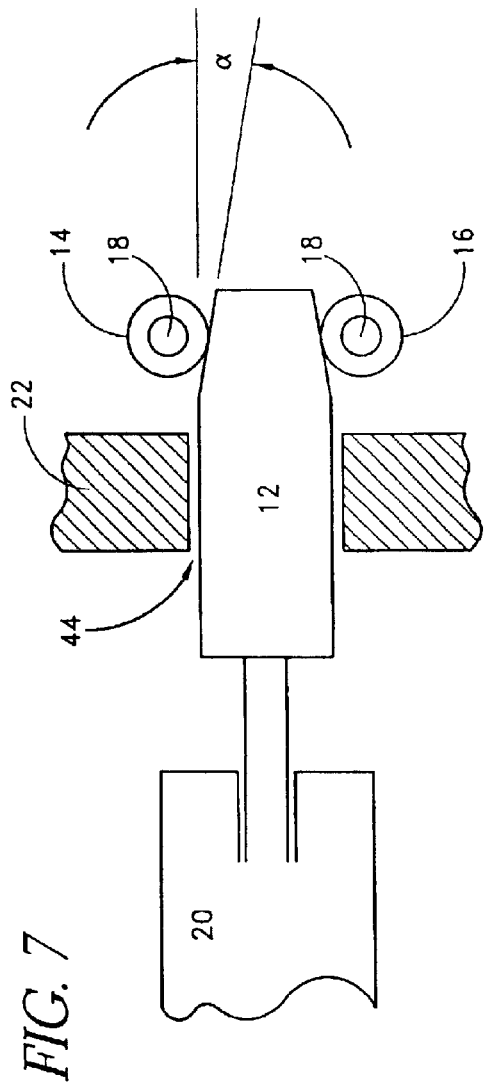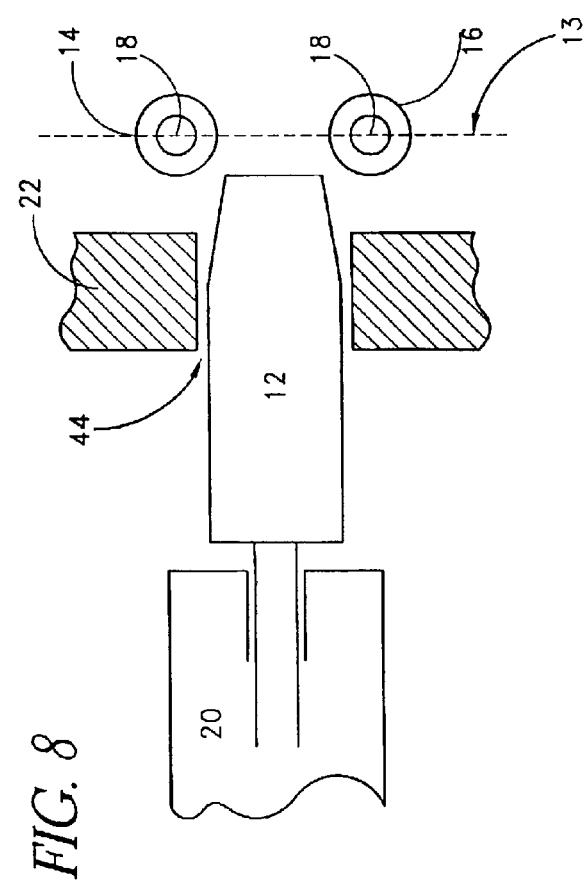
FIG. 7
FIG. 8

AIRCRAFT DOOR LATCH/LOCK MECHANISM WITH PNEUMATIC DECOMPRESSION OVERRIDE

BACKGROUND OF THE INVENTION

1. Field of the Invention

This application relates to locking mechanisms for doors, particularly doors used to separate an aircraft cockpit compartment from an aircraft passenger compartment.

2. Description of the Related Art

In a commercial airliner, a door is typically provided between the cockpit and the passenger area. This is desirable for a number of reasons. The door can be locked with a lock typically being controlled by the crew in the cockpit, such as an electrically operated lock. The door gives the crew in the cockpit a measure of security from disturbances in the passenger area. Also, it isolates the crew from the noise in the passenger area, which is desirable to prevent fatigue and to facilitate concentration. Also, with the cockpit sealed, the air conditioning in the cockpit can be handled in a manner different from the passenger area. This is advantageous for crew performance.

At the same time, it is necessary that the pressure differential between the cockpit and the passenger area not exceed a certain level in that a decompression condition in either area can cause serious structural damage to the airplane. Currently, this goal is accomplished by having a door locking mechanism give way when the door is subjected to a certain force, such as about 160 pounds. Unfortunately, a hijacker can fairly readily manually produce sufficient force to open the door in that fashion. Consequently, a need exists for a system that will provide the necessary privacy, prevent decompression damage, and at the same time provide the necessary security to prevent a hijacker from entering the cockpit. It is, of course, necessary that the system be practical and reliable.

SUMMARY OF THE INVENTION

In accordance with the invention, an aircraft door is provided with a strong locking mechanism that cannot be broken simply by manual force. The lock is controlled either by a crew member within the cockpit or a pressure sensor. The pressure sensor prevents damage to the aircraft if a decompression situation should occur in the cockpit. Decompression in the passenger area is not a concern since the amount of in-rushing air from the cockpit is small in comparison with passenger area volume.

A spring loaded catch cooperates with the door bolt or latch to hold the door closed. In the event a hijacker attempts to enter the cockpit compartment by applying a load on the door and locking mechanism, a pin supports the load on the door catch and prevents the hijacker from breaking connection between the door latch and the catch.

While the pin is able to withstand a force well over that which hijackers could apply, the pin can be quickly retracted from its supporting position to allow the door to overcome the spring force and swing open when a decompression event occurs in the cabin of the plane. The pin is retracted when the pressure sensor sends a signal to an actuator such as solenoid linked to the pin.

The attached drawings illustrate a concept for such a mechanism.

BRIEF DESCRIPTION OF THE DRAWINGS

FIG. 7 schematically shows a locking pin of the mechanism in an extended position.

FIG. 8 shows the locking pin in a retracted position.

DETAILED DESCRIPTION OF THE PREFERRED EMBODIMENT

Figure 1:
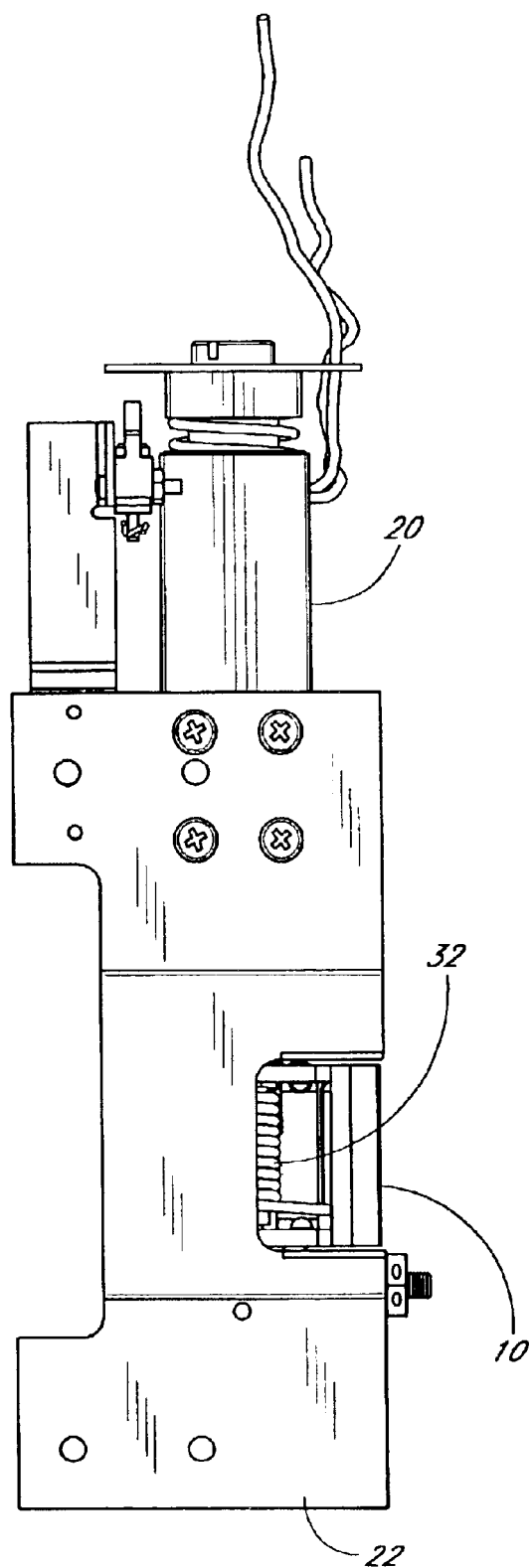
FIG. 1 shows a front view of the preferred embodiment of the locking mechanism of the invention.
Figure 2:
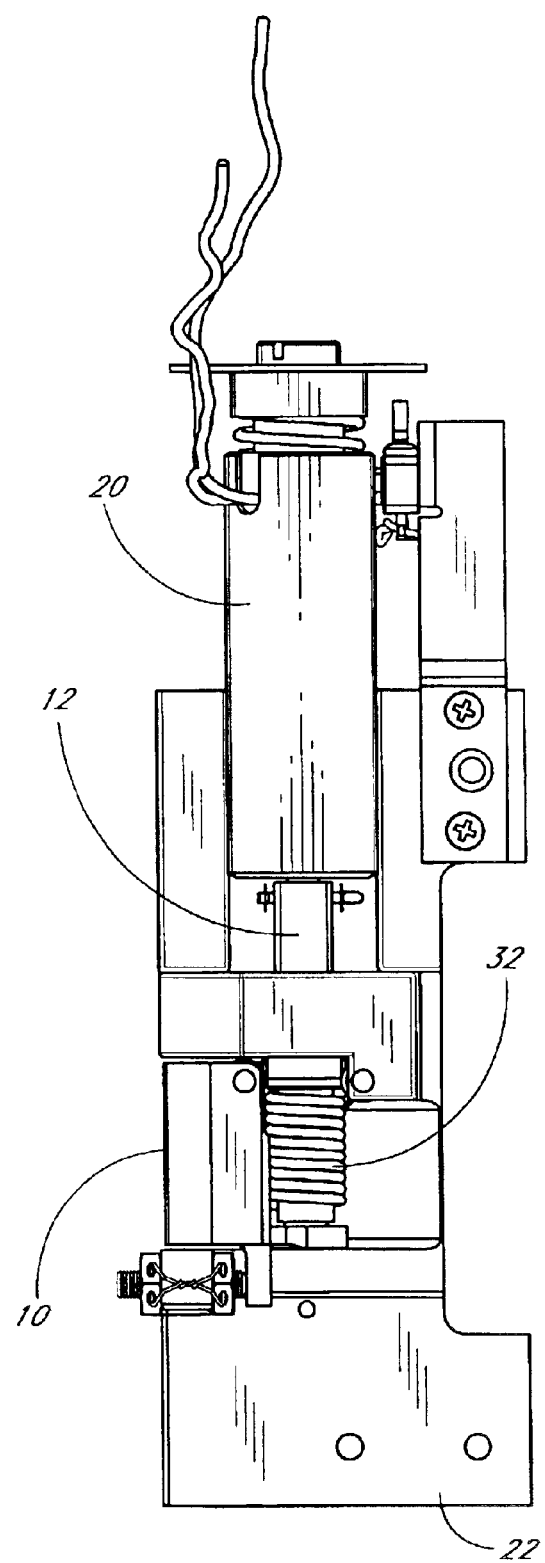
FIG. 2 shows a back view of the mechanism.
Figure 3:
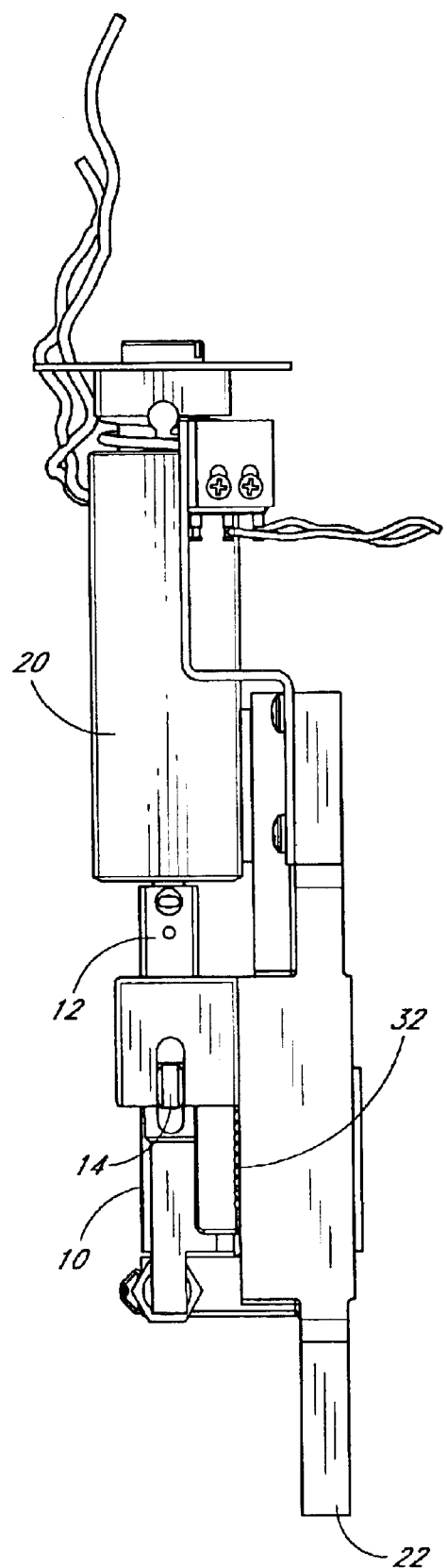
FIG. 3 shows a right side view of the mechanism.
Figure 4:
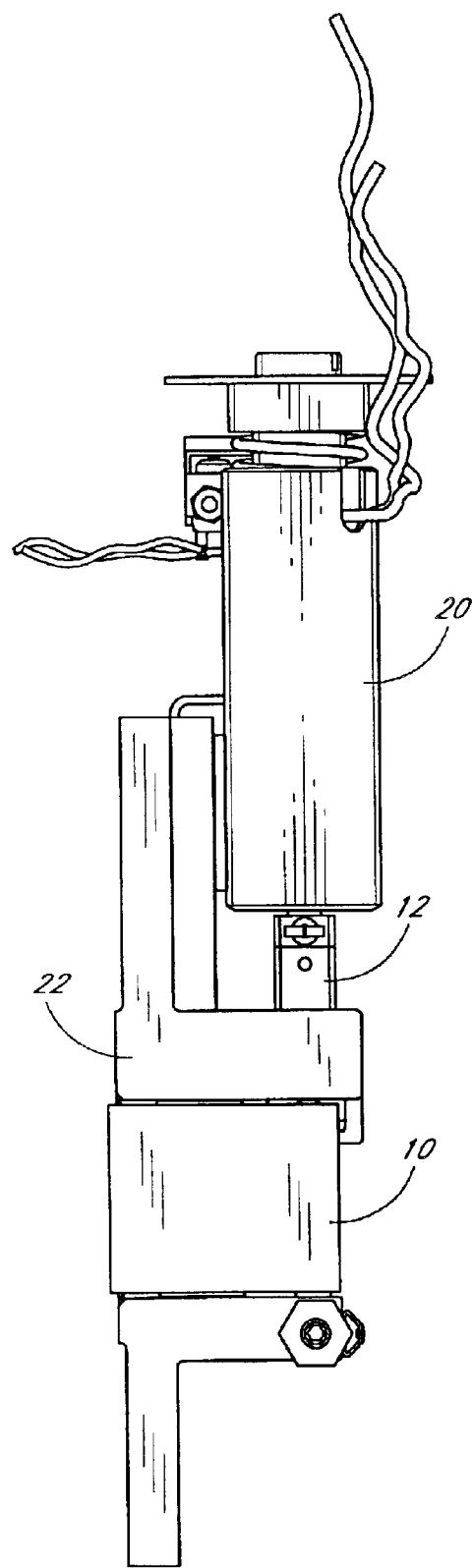
FIG. 4 shows a left side view of the mechanism.
Figure 5:
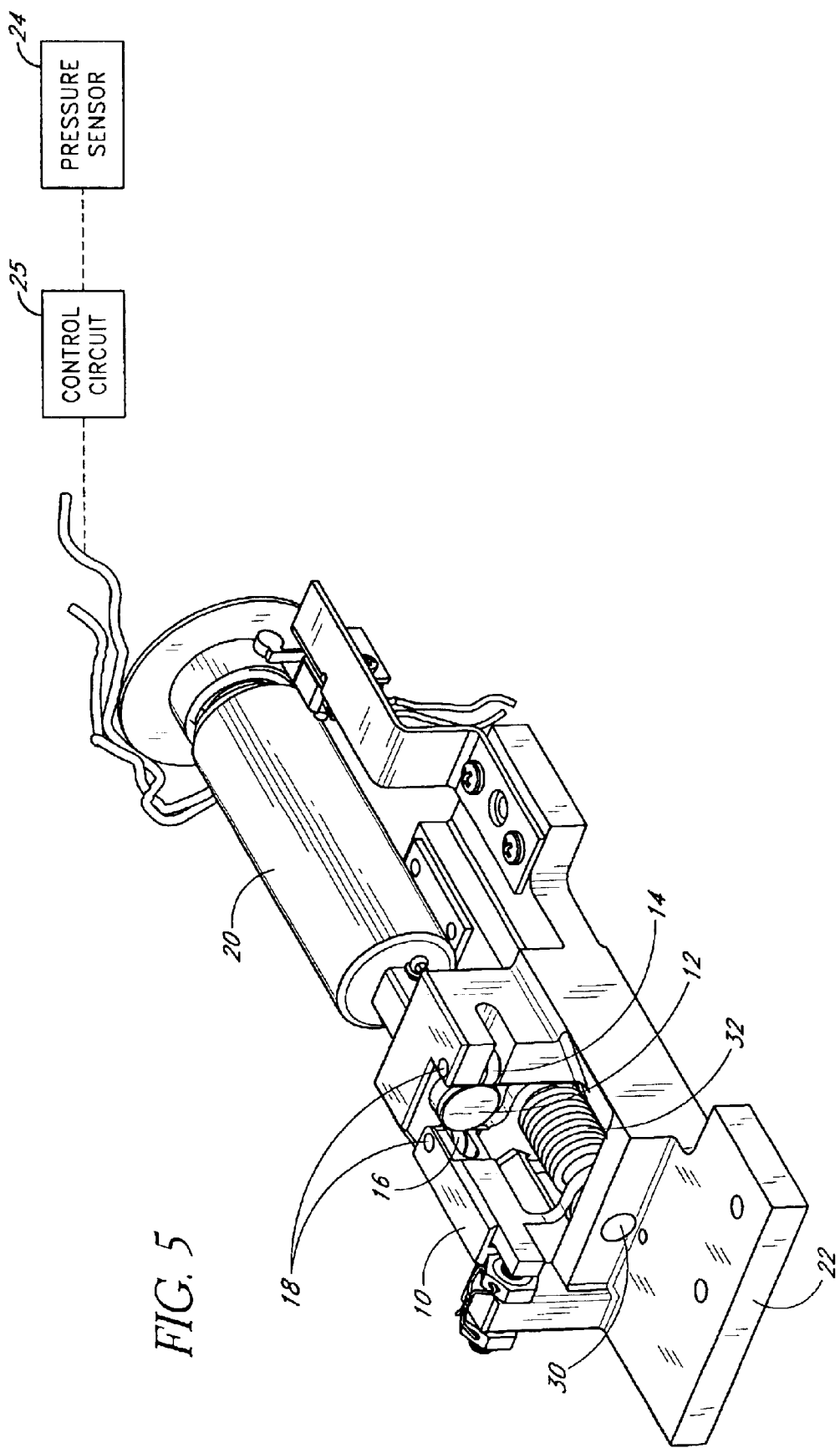
FIG. 5 shows a perspective view of the mechanism linked to a schematically illustrated pressure sensor and control circuit.
Figure 6:
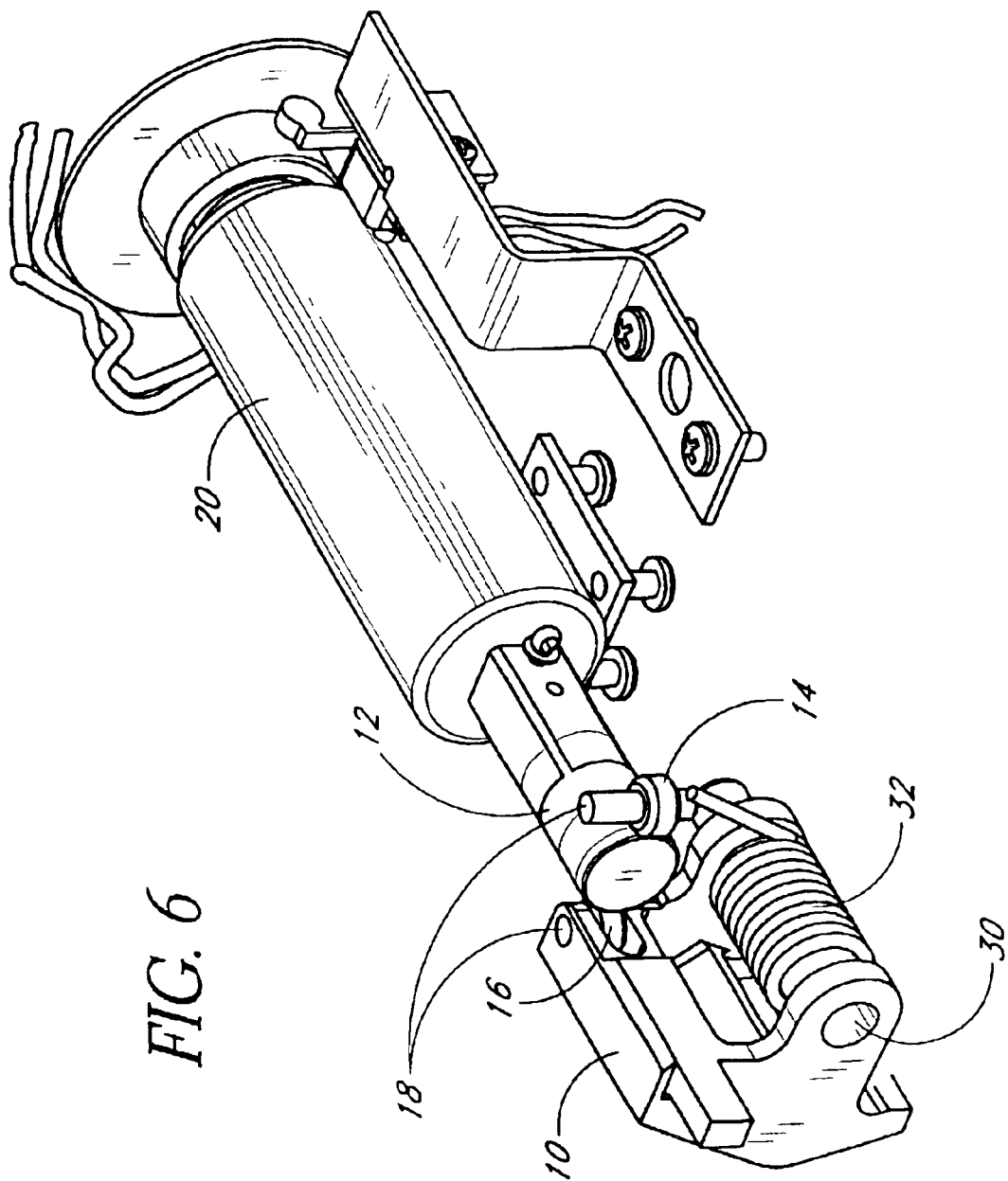
FIG. 6 shows an enlargement of the view in FIG. 5 without the support housing.
Figure 10:
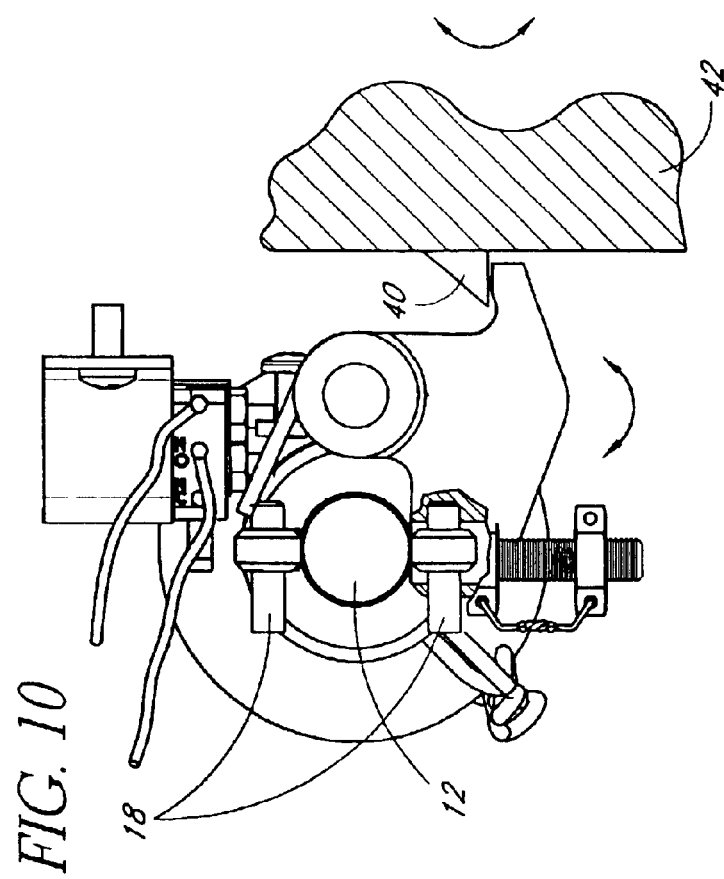
FIG. 10 is the same as FIG. 9 with a portion of the catch broken away to see the roller carried by the catch.

Referring to FIGS. 5 and 6, the latch mechanism of the invention includes a strike or catch 10, a pin 12, a pair of rollers 14 and 16 mounted on pins 18, and an actuator such as a solenoid 20, all supported on a housing or support 22. The solenoid is controlled by a schematically illustrated pressure sensor 24 and a control circuit 25. The latch mechanism is normally positioned vertically on a door frame aligned to allow a door bolt or latch to engage the catch 10 when a door is swung into a closed position.

Figure 9:
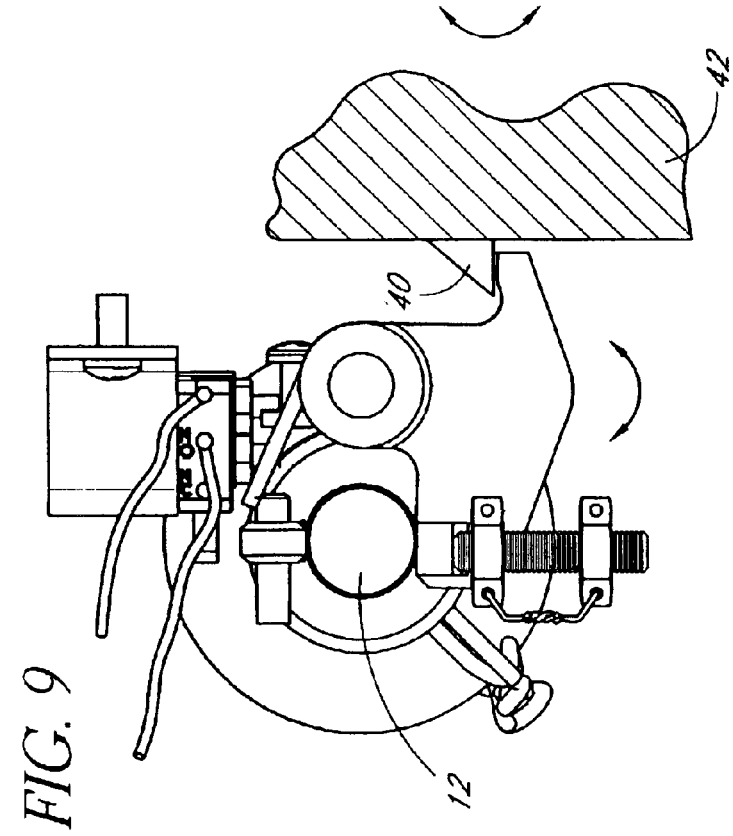
FIG. 9 is an end view of the locking mechanism with the main support removed and with the catch engaging a latch on a door.

As seen in FIGS. 5 and 6, the catch 10 is pivotally mounted on a pin 30 mounted on the support 22 and held in a normally door closed position by the urging of a biasing element such as a spring 32. The catch 10 is shown in FIG. 9 engaging a door latch or bolt 40 to hold a door 42 in a closed position. If, however, a force is applied against the door that exceeds the spring force, the catch 10 is rotated about the pin 30 to an unlatched position allowing the door to swing open. A door knob may be provided on the pilot compartment side to retract the latch 40 to open the door in conventional fashion.

Referring to FIGS. 6–10, the latch mechanism is reinforced with the pin 12, which is connected to the solenoid 20 to prevent unintended individuals, who exert a load on the door, from entering the cockpit. If such an individual tries to force the door open by overcoming the biasing spring 32, the catch 10 is maintained in the normal position by the pin 12 which is restrained by the roller 14 which is supported by the housing 22. Unlike the spring 32, the pin 12 backed by the support 22 can withstand a load greater than that which an intruder could manually produce.

As important as it is in preventing individuals from compromising the security of the occupants in the cockpit, the pin 12 would prevent the door from swinging open during a decompression event. Thus, the pin 12 must be quickly removed during such a catastrophic event. This is achieved by the cooperation of the pin 12, the solenoid 20, and the pressure sensor 24, and control circuit 25. The pressure sensor detects a significant change or rate of change in air pressure in the cockpit. When a dramatic change in air pressure occurs, the sensor deactivates the solenoid 20 which retracts the pin 12 away from its extended position, as shown in FIG. 7, to a retracted position shown in FIG. 8. When the pin 12 is fully retracted, the only force holding the door in the closed position is the biasing spring 32. However, because the pressure sensor will only send a signal to the solenoid 20 when the change in the cockpit air pressure is significant, the large load on the door will overcome the spring force and swing the door away from its closed position to equalize the air pressure between the cockpit and passenger cabin.

To aid with the retraction of the pin 12, the solenoid 20, which is commercially available, has two opposing springs for quick response. One spring urges the solenoid rod into its normal position in which the solenoid coil is not energized and the other spring provides force to assist the electrical force on the rod when the solenoid is energized. One suitable solenoid of this type is available from Moog, Inc., in Salt Lake City, Utah. In addition, the hole 44 for the pin in the support 22 is oversized so that friction is reduced or eliminated between the pin 12 and the hole when the pin extends into and retracts from the support. Preferably, the hole is sized so that the pin 12 does not come in contact with the support. Rather, the pin 12 floats through the hole 44 in the support 22 and is guided only by the rollers 14 and 16. The pin 18 for the roller 14 is mounted in the support 22 while the pin for the other roller 16 is mounted to the catch 10.

While the rollers 14 and 16 help maintain the proper position of the pin 12 even when a load, roughly perpendicular to the pin 12, is applied, they also provide the added advantage of reducing drag on the pin 12 when it rapidly retracts from its extended position. When the pin 12 is caused to retract, the rollers 14 and 16, by riding along the tapered tip of the pin 12, work to push the pin 12 away. In addition, when the tip of the pin passes the centerline 13 of the rollers, the roller 16 will push the pin away from the swing path of the catch 10.

The angle $\alpha$ of the slope on the tip of the pin 12 is preferably between 4 to 6 degrees for the purpose of assisting with the decompression event. However, one of ordinary skill in the art can appreciate that the angle $\alpha$ can be modified. The angle $\alpha$ is dependent on the size of the rollers 14 and 16 and their respective pivot pins 18, as well as the friction coefficient and holding force of the solenoid 20.

Based on decompression testing using the preferred embodiment, having a pin 12 design with sloped sides of 4 to 6 degrees, the door should be fully free to move within 4 to 12 milliseconds. The response time is dependent on the type of door and bolt.

TABLE 1

Decompression Test Configurations

| Test | PSI Differential | Mylar Pattern (Opening) | Door Configuration | Bolt Material |
|---|---|---|---|---|
| 1 | 2 | Circular | First | Nylon |
| 2 | 3 | Circular | First | Nylon |
| 3 | 3 | Square | First | Nylon |
| 4 | 3 | Circular | Second | 17-4 SS |
| 5 | 3 | Circular | Second | 17-4 SS |

Five separate tests were conducted on the preferred embodiment. As shown in Table 1, each test varied based on the amount of pressure applied, the mylar pattern employed, and the type of door and bolt used. To obtain a decompression event, mylar was burned enough to create a "full aperture." At that moment, the solenoid was caused to move triggering the pin to retract from supporting the catch. Table 2 provides the test results from the experiment. The results track the amount of time, in milliseconds, it took for: (1) the mylar to burn enough to create a "full aperture" ($T_{FA}$); (2) the solenoid to begin moving after full aperture ($T_{SS}$); (3) the pin to begin moving after the solenoid began moving ($T_{LSM}$); (4) the solenoid to reach full travel after the pin began to move ($T_{FT}$); and (5) the door to be free of the pin after the solenoid reached full travel ($T_{DF}$).

TABLE 2

Results from a Decompression Test showing Elapsed Time in Milliseconds

| Test | $T_{FA}$ | $T_{SS}$ | $T_{LSM}$ | $T_{FT}$ | $T_{DF}$ |
|---|---|---|---|---|---|
| 1 | 5.0 | 1.0 | 3.0 | 1.0 | 4.0 |
| 2 | 5.0 | 1.0 | 2.0 | 1.0 | 2.0 |
| 3 | 6.0 | 0.0 | 4.0 | 1.0 | 7.0 |
| 4 | 5.0 | 0.0 | 0.0 | 2.0 | 3.0 |
| 5 | 6.0 | 0.0 | 1.0 | 2.0 | 2.0 |
| Average | 5.4 | 0.4 | 2.0 | 1.4 | 3.6 |

$T_{FA}$ = Time it takes for mylar to burn enough to create a "full aperture" (decompression event)
$T_{SS}$ = Time when solenoid begins to move after $T_{FA}$
$T_{LSM}$ = Time when pin begins to move after $T_{SS}$
$T_{FT}$ = Time when solenoid reaches full travel (stroke) after $T_{LSM}$
$T_{DF}$ = Time when door is free of strike after $T_{FT}$ Based on the results of the testing, the average time it took after a decompression event for the solenoid to begin moving and triggering the pin was approximately 0.4 milliseconds. From that point, it took approximately 2.0 milliseconds for the pin to begin moving and 3.4 milliseconds for the solenoid to reach full travel. The average time it took for the door to be free of the strike after decompression was approximately 7.4 milliseconds.

As one of ordinary skill in the art can appreciate, the preferred embodiment is designed in such a way to respond with sufficient speed to deal with a decompression event. In addition, it is designed to provide the necessary support to maintain a cockpit door in a closed position even when an attempt is made to force the door open by an uninvited individual.

Although the foregoing invention has been described in terms of a preferred embodiment, other embodiments will become apparent to those of ordinary skill in the art, in view of the disclosure herein. Accordingly, the present invention is not intended to be limited by the recitation of the preferred embodiment, but is instead intended to be defined by reference to the appended claims.

What is claimed is:

1. A door strike mechanism to be mounted in a door frame to cooperate with a door latch on a door, said mechanism comprising:

a support;

a catch moveably mounted on the support in position to engage the door latch to hold the door closed;

a biasing element urging the catch into position to hold the door closed;

a pin having a locking position in which it prevents the catch from moving out of the door closed position;

a pressure responsive sensor initiating action to move the pin into an unlocked position permitting the catch to move when a sudden change in air pressure on one side of the door occurs, thus allowing the door to open;

a first roller mounted on said catch to engage one side of the pin when an opening force is applied to the door; and a second roller rotatably mounted on said support and engaging an opposite side of the pin to receive a load applied to the catch, said first and second rollers being mounted to be in rolling engagement with said pin to aid in movement of said pin when it is being moved to the unlocked position.

2. The mechanism of claim 1 wherein the pin is axially moveable and each roller is mounted on an axis that is substantially perpendicular to the pin axis.

3. The mechanism of claim 1 wherein said first and second rollers engage a tip of the pin and the tip is tapered to facilitate the withdrawal of said pin from engagement with said first and second rollers.

4. The mechanism of claim 3 wherein the taper on the pin tip is no more than about 12°.

5. The mechanism of claim 3 wherein the taper of said tip is in the range of about 4° 6°.

6. The mechanism of claim 5 wherein the taper of said tip is about 5°.

7. The mechanism of claim 1 including an actuator for moving the pin between the locking position and the unlocked position, and wherein said sensor provides a signal to energize the actuator.

8. The mechanism of claim 7 wherein said actuator is a solenoid.

9. The mechanism of claim 8 wherein the solenoid provides mechanical force urging said pin into retracted position so as to obtain fast action.

10. The mechanism of claim 1 wherein said biasing element is a spring.

11. A door strike mechanism to be mounted in a door frame to cooperate with a door latch on a door, said mechanism comprising:

a support;

a catch pivotally mounted on the support in position to engage the door latch to hold the door closed;

a spring urging the catch into position to hold the door closed;

a pin having a locking position in which a tip of the pin prevents the catch from moving out of the door closed position, the pin being positioned so that a force applied to the pin by the catch is transferred to said support;

a solenoid for axially moving the pin between the locking position and an unlocked position in which the tip of the pin is retracted to permit the catch to move against the urging of said spring; and a pressure responsive sensor providing a signal to the solenoid to move the pin into the unlocked position when a sudden change in air pressure on one side of the door occurs.

12. The mechanism of claim 11, including a first roller mounted on said catch to engage the pin when an opening force is applied to the door, and a second roller rotatably mounted on said support and engaging an opposite side of the pin to provide lateral support to the pin when a large force is applied to said door, said first and second rollers being mounted to guide said pin in rolling engagement to facilitate retraction of said pin.

13. The mechanism of claim 12 wherein the tip of the pin is tapered to facilitate the withdrawal of said pin from engagement with said first and second rollers.

14. The mechanism of claim 13 wherein the taper on the pin tip is no more than about 12°.

15. The mechanism of claim 13 wherein the taper on the pin tip is in the range of about 4°–6°.

16. The mechanism of claim 15 wherein the taper of said tip is about 5°.

17. The mechanism of claim 11 wherein the solenoid is configured to provide mechanical force and electrical force to urge said pin into retracted position so as to obtain fast action.

18. A door strike mechanism to be mounted in a door frame to cooperate with a door latch on a door, said mechanism comprising:

a pivotally mounted catch;

a spring urging the catch into position to hold the door closed;

an axially moveable pin; and a pair of rollers positioned to guide the movement of the pin, one of the rollers being mounted on the catch to transmit load from the catch to the pin, and the other being mounted on a support to transmit the load to the support, said pin being moveable between a locking position preventing pivoting of the catch and an unlocked position in which the pin is withdrawn from the rollers to permit the catch to pivot in response to a predetermined force applied to the door.

19. A method of preventing a door being manually forced open while permitting the door to open in response to sudden air pressure drop on one side of the door, said method comprising the steps of:

providing a door catch which is urged into position to engage a door latch to hold the door closed;

providing a pin to block movement of the catch that would release the door latch;

engaging one side of a tip of the pin with a first roller mounted on the catch;

engaging an opposite side of the pin tip with a second roller mounted to a support to receive a door opening force;

providing an actuator to retract the pin in response to a sudden air pressure drop so as to allow the catch to move to a door open position in response to a door opening force large enough to cause the catch to move to release the latch, said first and second rollers being configured to facilitate retraction of said pin.

* * * * *

UNITED STATES PATENT AND TRADEMARK OFFICE
CERTIFICATE OF CORRECTION

PATENT NO. : 6,902,137 B2
DATED : June 7, 2005
INVENTOR(S) : Marek S Brzeski

It is certified that error appears in the above-identified patent and that said Letters Patent is hereby corrected as shown below:

Column 5,
Line 13, delete "4° 6°" and insert -- 4°-6° --.

Signed and Sealed this

Ninth Day of May, 2006

JON W. DUDAS
*Director of the United States Patent and Trademark Office*